United States Patent [19]

Gross et al.

[11] Patent Number: 4,764,335

[45] Date of Patent: Aug. 16, 1988

[54] METHOD AND APPARATUS FOR DIAGNOSING BREACHED FUEL ELEMENTS

[75] Inventors: Kenny C. Gross, Lemont; John D. B. Lambert, Wheston, both of Ill.; Shigeo Nomura, Mito, Japan

[73] Assignee: The United States of America as represented by the United States Department of Energy, Washington, D.C.

[21] Appl. No.: 20,997

[22] Filed: Mar. 2, 1987

[51] Int. Cl.$^4$ ............................................. G21C 17/06
[52] U.S. Cl. .................................................. 376/253
[58] Field of Search ............................... 376/251, 253

[56] References Cited

U.S. PATENT DOCUMENTS

| | | | |
|---|---|---|---|
| 3,786,257 | 1/1974 | Weiss et al. | 376/253 |
| 4,080,250 | 3/1978 | Honekamp et al. | 376/251 |
| 4,135,970 | 1/1979 | Mitsutsuka et al. | 376/253 |
| 4,347,214 | 8/1982 | Sato et al. | 376/251 |
| 4,415,524 | 11/1984 | Gross et al. | 376/253 |
| 4,495,143 | 1/1985 | Gross et al. | 376/253 |
| 4,582,671 | 4/1986 | Rindo | 376/253 |

OTHER PUBLICATIONS

McCormick, "A Computational Technique to Assess Proced. for Failed-Fuel Identification," Nuclear Sci. & Eng., 567-15, 1975.

So et al., "Fission Gas Behavior in the EBR-II Primary System," Trans. Am. Nucl. Soc., vol. 27, Nov. 1977.

Primary Examiner—Deborah L. Kyle
Assistant Examiner—Richard Klein
Attorney, Agent, or Firm—Gustavo Siller; Paul A. Gottlieb; Judson R. Hightower

[57] ABSTRACT

The invention provides an apparatus and method for diagnosing breached fuel elements in a nuclear reactor. A detection system measures the activity of isotopes from the cover-gas in the reactor. A data acquisition and processing system monitors the detection system and corrects for the effects of the cover-gas clean up system on the measured activity and further calculates the derivative cure of the corrected activity as a function of time. A plotting system graphs the derivative curve, which represents the instantaneous release rate of fission gas from a breached fuel element.

18 Claims, 8 Drawing Sheets

METHOD AND APPARATUS FOR DIAGNOSING BREACHED FUEL ELEMENTS

CONTRACTUAL ORIGIN OF THE INVENTION

The U.S. Government has rights to this invention pursuant to Contract No. W-31-109-ENG-38 between the U.S. Department of Energy and The University of Chicago representing Argonne National Laboratory.

BACKGROUND OF THE INVENTION

This invention pertains in general to a system for detecting the presence of failed fuel elements within the core of a nuclear reactor and more particularly, to an on-line system for diagnosing the identity and condition of breached fuel elements in a nuclear reactor.

The reactor fuel in a fission type reactor is typically an isotope of uranium, such as uranium 235. The reactor fuel may take the form of a fluid, such as an aqueous solution of enriched uranium; but typically the fuel is solid, either metallic uranium or a ceramic such as uranium oxide or uranium-plutonium oxide. The solid fuel material is fabricated into various small plates, pellets, pins, etc; which are usually clustered together in an assemblage called a fuel element. Almost all solid fuel elements are clad with a protective coating or sheath that prevents direct contact between the fuel material and the reactor coolant. The cladding also serves as part of the structure of the fuel elements.

The operation of the fuel elements generates heat, which heat is typically dissipated by means of a coolant passed through the reactor. The coolant can be water operating as either liquid or steam, or the coolant can be a liquid metal such as sodium or a sodium-potassium mixture. The coolant passes in proximate contact over the cladded-fuel elements; and sound cladding isolates or separates the coolant from the radioactive fuel material. However, in the event of a breach in the cladding, the coolant directly contacts the fuel. The radioactive discharge may then in turn be conveyed via the coolant throughout the entire coolant system thereby contaminating the entire system.

Also given off, as part of the radioactive discharge, are at least nine different isotopes that not only give off typical gamma rays of radioactivity, but also give off what are known as delayed neutrons. These isotopes, or delayed neutron emitters, would include bromine, iodine, and tellurium to name a few. Each of these delayed neutron emitters is soluble in liquid sodium (the coolant) so that it readily blends in with the coolant, should a fuel element cladding breach occur, and flows from the coolant throughout the system.

Therefore, it becomes readily apparent that the event of fuel cladding breaches must be taken into account when designing and operating a nuclear reactor. A quick and precise diagnosis of cladding breach events would ensure that the reactor operator would correctly respond upon the occurence of such a breach. A precise diagnosis of the condition of a breached pin would introduce significant advantages for reactor plant operation. The reactor could be safely operated under such breached pin conditions until a predetermined allowable radioactivity limit is exceeded. In the event that this predetermined limit is not exceeded, the reactor could be safely operated until the next scheduled discharge. Further, if a system could accurately diagnose whether a cladding breach is stable or unstable, the reactor operator could continue the operation of the reactor in the event of a stable breach and shut down the reactor upon the occurrence of an unstable breach. The continued operation of the reactor under a stable breached pin condition could significantly improve reactor availability.

Conventionally, radioactive elements which have mixed with the coolant are detected by means of a GeLi detector (a germanium and lithium gamma-ray detector) incorporated into a GLASS (a germanium-lithium argon scanning system), or other readily available detecting systems. These systems are used to detect the activity in the cover gas of the reactor. Typically however, these systems have been used only as an annunciation of fuel failure. After identification of a "gas leaker" (a breached fuel element), fission gas activity is typically removed by a plant cleaning system, such as the cover gas cleanup system (CGCS) used in EBR-II. This system removes fission gas activity from the reactor cover gas by semicontinuously extracting part of the cover-gas, cleaning it cryogenically and returning it to the core. The CGCS allows the reactor to be operated after a breach has occurred in a fuel element. However, the system effectively obscures any information about the failure which may be contained in the gas release data obtained from a GLASS.

Therefore, typically used in conjunction with CGCS are delayed neutron systems such as the system disclosed in U.S. Pat. No. 4,415,524 issued to K. C. Gross et al., and/or fuel element failure location systems, such as the gas tagging system disclosed in U.S. Pat. No. 4,495,143, issued to K. C. Gross et al., which monitor the identity and condition of breached pins. However, such systems provide only very qualitative information about the type of breached fuel involved (oxide or metal), and its burnup (high or low).

The run beyond clad breach mode operation of a commercial liquid metal reactor may not be allowed without an on-line identification of breached pins and a diagnosis of the breached pin condition and development. The diagnosis of a breached pin should include a reliable prediction of the on-going condition of the event.

Therefore, in view of the above, it is an object of the present invention to provide an on-line apparatus and method for diagnosing the severity of a breached fuel element.

It is another object of the present invention to provide an on-line apparatus and method for determining the number of breached fuel elements.

It is another object of the present invention to provide an apparatus and method for determining the mode of gas released from a breached fuel element.

It is a further object of the present invention to provide an apparatus and method for determining the breaching mechanism in a fuel element.

It is still a further object of the present invention to provide an apparatus and method for determining if a breach in the cladding of a fuel element is benign or unstable.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing, and other objects the present invention, the present disclosure provides an apparatus and method for diagnosing breached fuel elements in a nuclear reactor having a cover-gas cleanup system. According to the present invention, a detection system measures the activity from isotopes in the cover gas of a reactor. A data acquisition and processing system monitors the output of the detection system and corrects for the effects of the cover gas cleanup system on the measured gas activity. The data acquisition and processing system further calculates the curves of the derivative of the corrected gas activity as a function of time for each measured isotope. A display means exhibits graphs the curves of the corrected gas activity and derivative thereof as a function of time. The derivative curve represents the instantaneous release rate of fission gas from a breached fuel element.

DETAILED DESCRIPTION OF THE INVENTION

Figure 1:
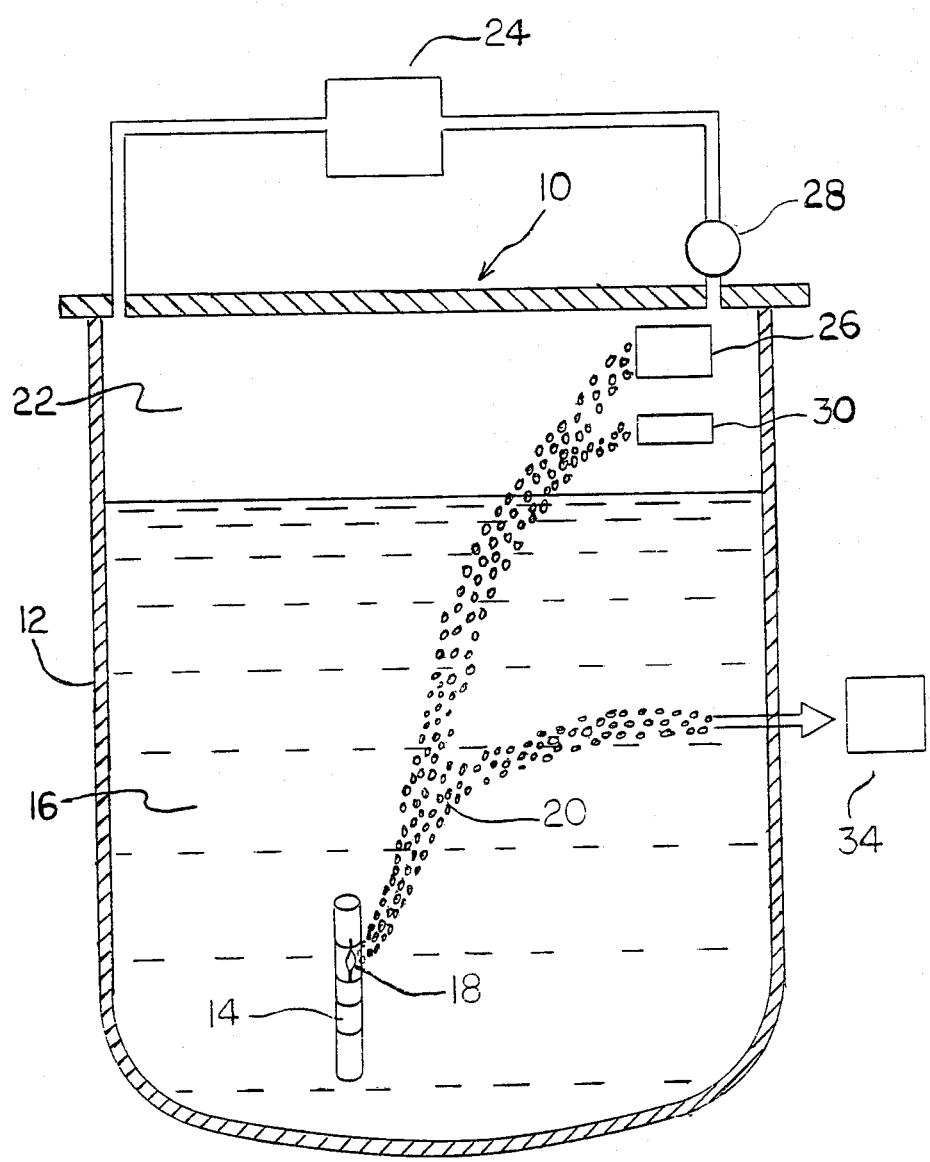
FIG. 1 is a schematic representation of a nuclear reactor having the breached fuel diagnostic system of the present invention.

Reference will now be made in detail to the preferred embodiment of the present invention, examples of which are illustrated in the accompanying drawings. Referring to FIG. 1, a nuclear power system is illustrated in schematic form. Reactor 10 has a containment vessel 12 within which a core, comprised of a plurality of fuel elements 14, is located. The entire vessel 12 confines a pool of coolant 16, which typically is liquid sodium. A breach in the cladding of fuel element 14, illustrated by opening 18 allows released isotopes 20 to enter into the coolant 16.

When fission gas 20 is released from a breached cladding to flowing sodium 16 in the core, the turbulent mixing with sodium breaks down fission gas bubbles to sizes small enough that their transport is similar to that of atoms. Fission gas 20 migrates upward through the layers of sodium 16 and enters the cover gas 22. Fission gas can be lost by decay, by leakage of the cover gas 22, by cold trapping of iodine and bromine parents, by hold up in the sodium itself, and as a result of the use of a cover-gas cleanup system. As discussed above, the disadvantage of the cover-gas cleanup system is that its use makes difficult any on-line diagnosis of the correlation between fission gas activities from a breached pin and the condition of the breach. In order to study any such correlation the effects of the cover-gas cleanup system 24 on the fission gas release measured by activity detector means 26 from a breached pin 14 must be corrected. The correction can be calculated by the solution of the differential equations for fission gas transport. The differential equations describing the transport of fission gas from the release in the core to the cover gas have been introduced by So et al., Trans. Am. Nuc. Soc., Vol. 27, Nov. 1977. The calculation involves the solution of the differential equations for the production and decay for parent, metastable daughter, and daughter isotopes of the fission gas isotopes that are be monitored by the detector system 26. Preferably the detector system 26 is a germanium-lithium argon scanning system, such as the system which has been used at EBR-II.

The following describes the method of calculation for the correction. The correction is calculated using the equations which describe the transport and decay of radioactive fission gas (FG) 20 from the primary sodium 16 to the cover gas 22. An isotope-production term, $P_j$, in the cover gas 22 can be given, assuming a linear approximation for an appropriately defined time interval dt, as follows;

$$P_j = dc/dt + C_j(X_i + X_L + X_p) \qquad (1)$$

dt = Time interval between $t_j$ and $T_{j+1}$;
dc = Activity difference of FG isotope i at the time interval dt;
  = $C^*_{j+1} - C^*_j$
$C_j$ = Activity at $t_j$;
$X_i$ = decay constant of FG i;
$X_L$ = Cover-gas-leak-rate constant;
$X_P$ = Cover-gas-purge-rate constant;
  = Cover-Gas-purge-rate/cover gas volume (F/V)

For no CGCS operation, Eq.(1) may be rewritten as:

$$dC^*/dt = P_j - C^*_j(X_i + X_L) \qquad (2)$$

$dC^*$ = Activity difference at dt without CGCS operation
  = $C^*_{j+1} - C^*_j$
and $C^*_j$ = Activity at $t_j$ Therefore, the corrected activity $C^*_{j+1}$ at $t_{j+1}$ can be obtained from Eq. (2) by using $P_j$ obtained in Eq. (1) as follows:

$$C^*_{j+1} = [P_j - C^*_j(X_i + X_L)]dt + C^*_j. \qquad (3)$$

The leak rate coefficient, $X_L$, may be obtained from the measured amount of fresh argon required to produce a constant pressure in cover gas 22. $C^*_0$ is defined as the value of $C_0$ at $t_0$ for the initial condition of iterated calculation. The cover-gas-purge-rate (F) may be determined by measuring means 28. Natural decay constants may be obtained from M. E. Meek and B. F. Ryder "Compilation of Fission Products Yields", NEDO 12/56-2,1976. The pertinent decay constants are listed below in TABLE-I.

TABLE-I

Decay Constants Used in Calculations

| Isotope | Decay constant $(X_i)_s^{-1}$ |
| --- | --- |
| Kr-85 m | $4.30 \times 10^{-5}$ |
| Kr-87 | $1.52 \times 10^{-4}$ |
| Kr-88 | $6.88 \times 10^{-5}$ |
| Xe-133 | $1.52 \times 10^{-6}$ |
| Xe-135 m | $7.55 \times 10^{-4}$ |
| Xe-135 | $2.10 \times 10^{-5}$ |
| Xe-138 | $8.14 \times 10^{-4}$ |

Figure 2:
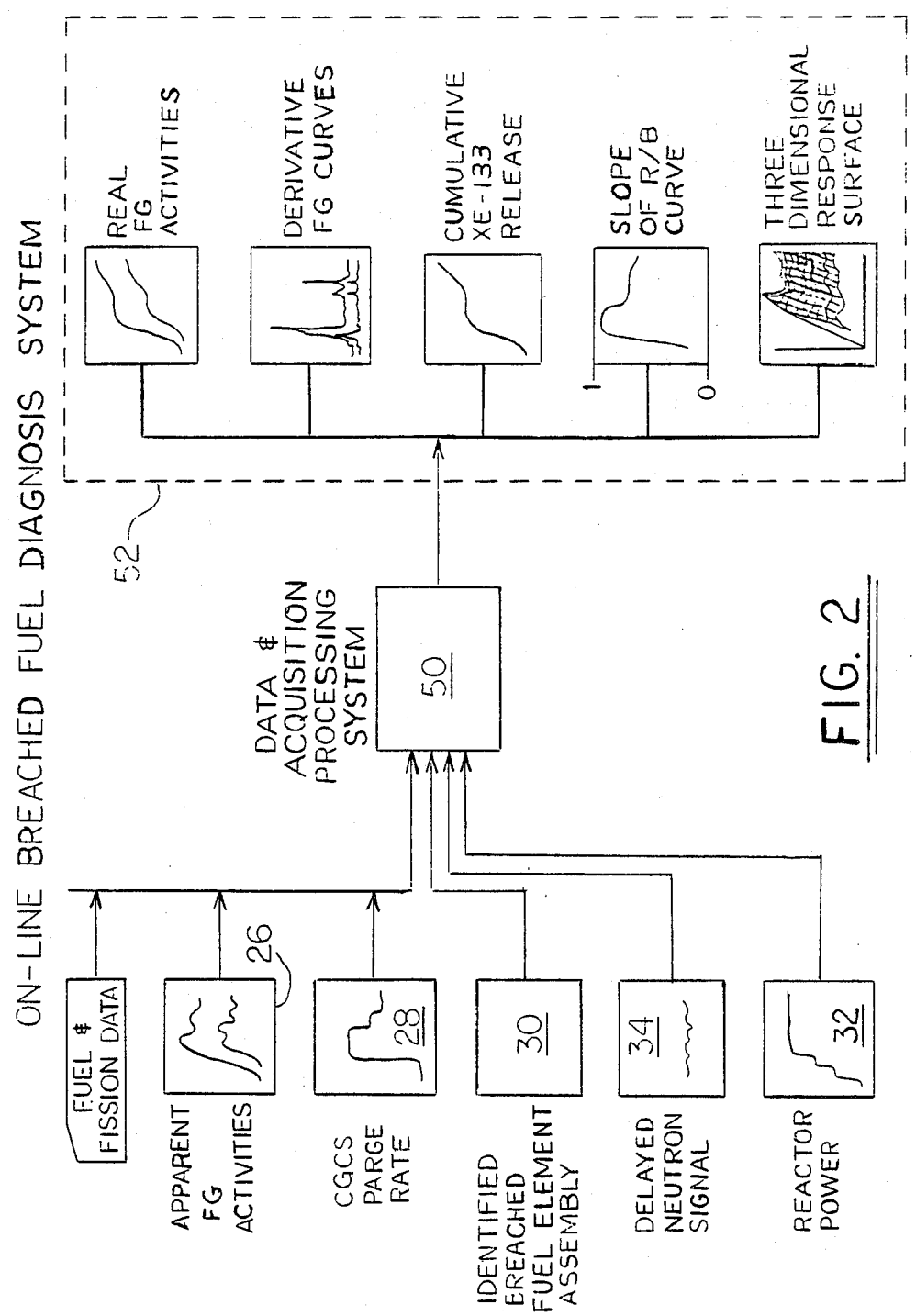
FIG. 2 is a schematic representation of the breached fuel diagnostic system of the present invention.

The calculations of the corrected fission activity without CGCS 24 may be performed by means of a data acquisition and processing system. FIG. 2, wherein like elements are referred to with like numerals, is a schematic representation of the present invention. The apparent fission gas activity output from the GLASS 26 is monitored by data acquisition and processing system 50, which subsequently calculates the corrected fission gas activity without the CGCS 24 according to the equations given above.

The time derivative of the corrected fission-gas activity curve without CGCS 24 operation, which may also be calculated by microprocessor system 50, provides a plot of instantaneous release rates of fission gas 20 escaping from a breached pin 14, at each moment in time. The pre-existing activities, especially for isotopes having long half lives, such as Xe-133 and Xe-135, may be ignored. In an exemplary embodiment of the present invention, a microprocessor system comprises data acquisition and processing system 50.

Figure 3:
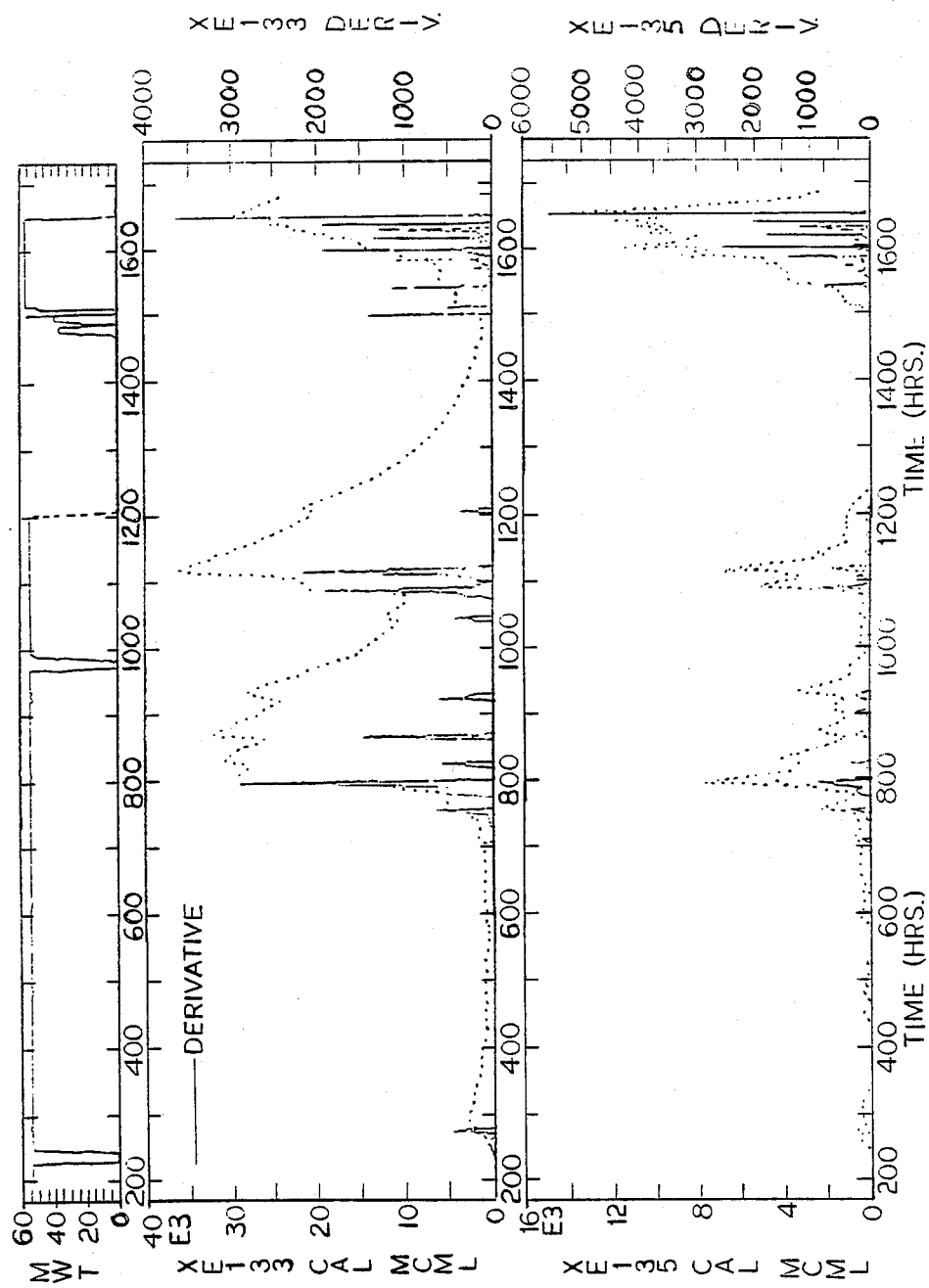
FIG. 3 is representative curves for corrected fission gas activity and the derivative thereof as functions of time.

A display means 52, which preferably is a plotting means, is responsive to the output from data acquisition and processing system 50 and displays or graphs the plots of the real fission-gas activities and the derivative fission-gas curves. Thus, small gas releases from a fuel element 14 may be easily detected by examining the derivative fission gas curves which represent the instantaneous release rates. FIG. 3 shows representative curves for the corrected fission gas activities as a function of time for two isotopes as dotted lines and their derivatives as solid lines. These representative curves were obtained in the Run-Beyond-Cladding-Breach tests performed on EBR-II.

The quantity of fission gas 20 released to the reactor cover gas 22 with time is very useful information for estimating both the number of breached pins and the breached mechanism. The quantity of released gas in an appropriate time interval may be obtained by multiplying the net source rate (the background source rate, measured by the GLASS system, subtracted from the isotope production term $P_j$) by the length of the time interval multiplied by the cover-gas volume. The cumulative released activity with time may then be obtained by a summation of the quantity of released gas in each time interval. Preferably this method is applied to the longest lived isotope of Xe-133, since it is possible to compare directly with the calculated stored gas activity in a pin without a large correction for isotope decay.

Information from a fuel failure location system 30, such as a gas tagging system, can be used to determine the location of breached fuel elements. Microprocessor 50 can subsequently use the output from the gas tagging system 30 in combination with fuel and fission data to determine the theoretical fission gas activity of Xe-133 stored in a breached pin 14. Cumulative fission gas activity can subsequently be converted to a number of failed pins in the core by dividing by the theoretically calculated Xe-133 activity stored originally in the pin. The calculated activity is not affected by the fissile element kind, since cumulative fission yields for Xe-133 for the main fissile species (U-235, U-238 and Pu-239) are almost equivalent.

Gas release from breached pins may occur by one of three mechanisms. It is important in diagnosing a breached pin to distinguish between these three modes of gas release. Stored gas release, as its name implies, is the pressure-driven release of internally stored gas to the coolant 16. The stored gas has achieved radioactive equilibrium in most cases, so that the gas has the same isotopic composition in every release. Diffusional gas release is that which comes from the fuel interior itself; its rate is governed by the concentration gradient of isotopes through the fuel. Direct recoil release emits fission-product atoms which are recoiled free from the surface at the moment of fission.

A release-to birth ratio (R/B) analysis may be used to distinguish these three modes of gas release. As will be shown below, the best-fit value of the slope of the log $(R_i/B_i)$ vs. log $X_i$ in a given time interval indicates the type of gas release. Equations for $R_i/B_i$ ratios in simplified condition have been derived for the three modes of gas release as follows:

$$\text{Stored-Gas Release; } R_i/B_i = X_e[1 - exp(-X_i t)]/X_i \tag{4}$$

$$\text{Diffusional Release; } R_i/B_i = 3[D_i/(X_i a^2)]^{\frac{1}{2}} \tag{5}$$

$$\text{Direct Recoil Release; } R_i/B_i = kSL_i d/(4W_j) \tag{6}$$

where
$X_e$ = Effective escape-rate coefficient,
t = Irradiation time,
$D_i$ = Diffusion coefficient,
a = Radius of the equivalent sphere of fuel,
k = Enhancement factor,
S = Geometric defect area,
$L_i$ = Recoil range of fusion gas species i,
d = Density of fissile material,
$W_j$ = Mass of fissile isotope j in pin, These equations show that for steady-state conditions, the $X_i$ dependences on the $R_i/B_i$ ratio are $-1$, $-\frac{1}{2}$, and 0 for the stored-gas, diffusional-gas, and direct-recoil release mechanisms, respectively, in a log-log plot (the actual solution for direct recoil release is a small negative value). In the present analysis, the disengagement rate $R_i$ from the sodium 16 to the cover gas 22 for the i-th FP isotope is defined by:

$$R_i = [n_i]_{Na}(X_d) \tag{7}$$

where
$[n_i]_{Na}$ = Number of atoms of isotopes i in sodium phase
$X_d$ = Disengagement-rate constant, $R_i$ can be obtained by means of microprocessor 50 by using the derivative values, $dC^*/dt$, and the corrected activity corrected for CGCS operation $C^*$, in the differential equations for fission gas transport as follows:

$$R_i = 37V\left(\frac{1}{X_i}\frac{dC_i}{dt} + \left(\frac{x_i + X_L}{X_i}\right)C^*_i\right)\frac{(X_i + X_d)}{X_d} \tag{8}$$

for Kr-85 m, Kr-87, Kr-88, Xe-135 m, and Xe-138; and $$R_i = 37V\left[\left(\frac{1}{X_i}\frac{dC^*_i}{dt} + \left(\frac{X_i + X_L}{X_i}\right)C^*_i - \left(\frac{(fX_{i-1})}{X_i}C^*_2\right)\left(\frac{X_i + X_d}{X_d}\right)\right)\right] \quad (9)$$

for Xe-135 an Xe-133, where
  f = Branching factor (fraction of isotope i produced when the parent has two or more modes of decay),
  V = Cover-gas volume.

By defining release rates in terms of changes in measured cover-gas activities, the analytical difficulties that arise in modeling the complex processes of iodine and bromine precursors, trapping by the cold trap and decay of solid precursors, have been avoided. The birth rate of the i-th isotope in the fuel pins is given by:

$$B_i = Y_{ij}F_jW_j \quad (10)$$

where
  $Y_{ij}$ = cumulative fission yield of isotope i, fraction
  $F_j$ = Specific fission rate for fissile isotope j,
The specific fission rate $F_j$ may be determined from the reactor power which is measured by reactor power detection means 32.

Thus the operator of the reactor may determine the type of gas release emitted from a breached element by viewing a graph of the R/B curves, generated by plotting means 52.

Figure 4:
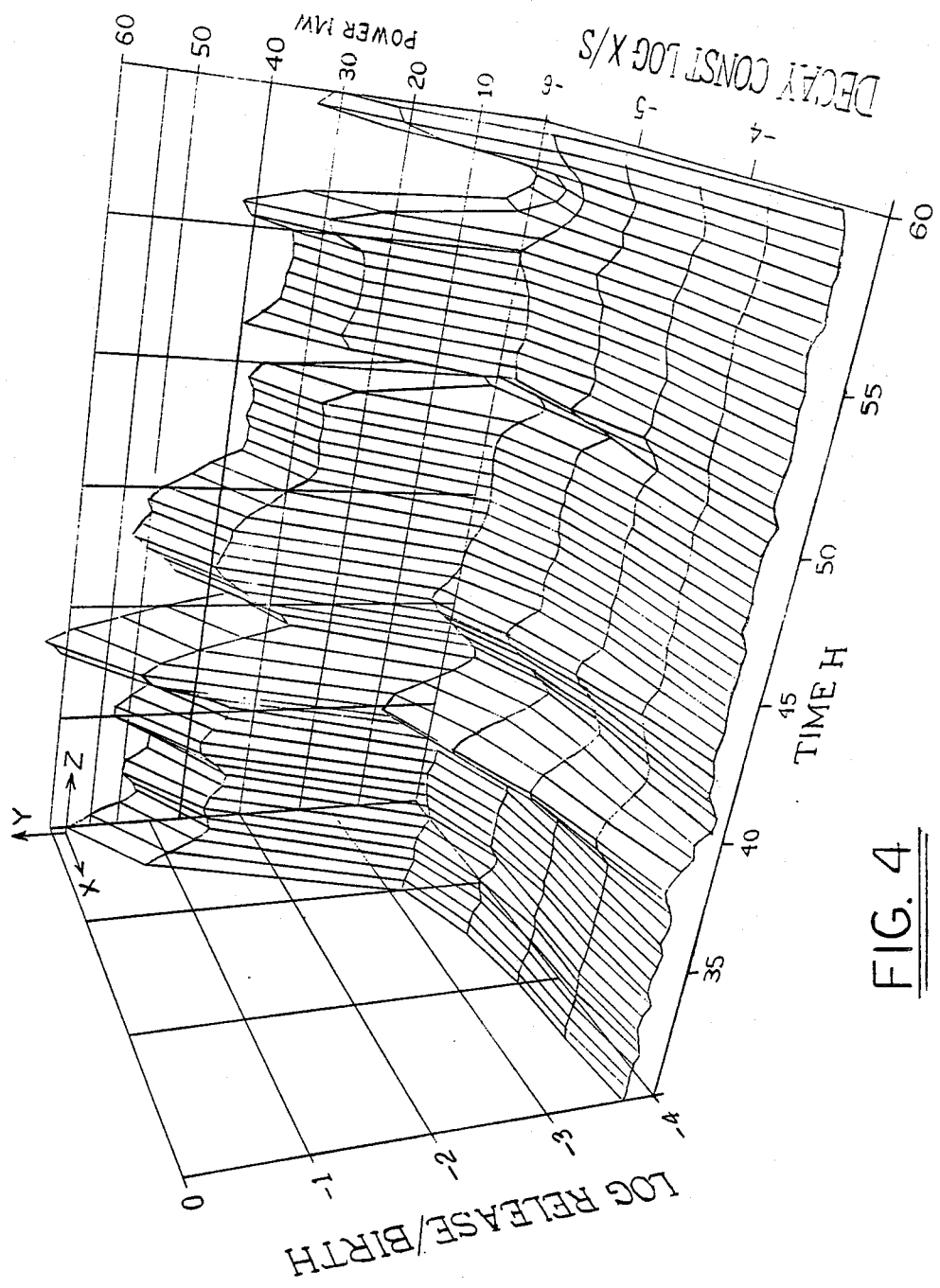
FIG. 4 is a representative 3-D curve for stored gas release.
Figure 5:
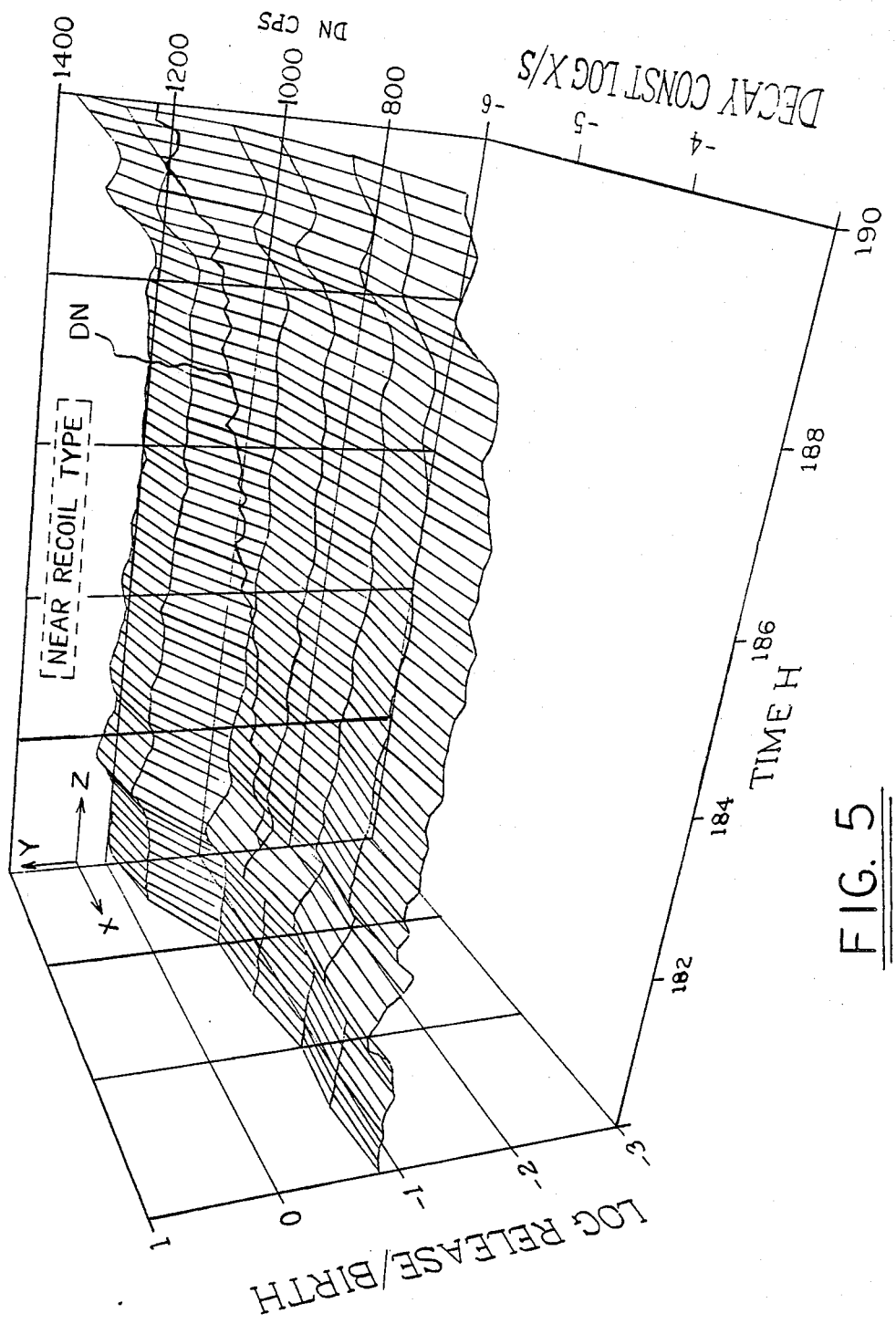
FIG. 5 is a representative 3-D curve for diffusional gas release.
Figure 6:
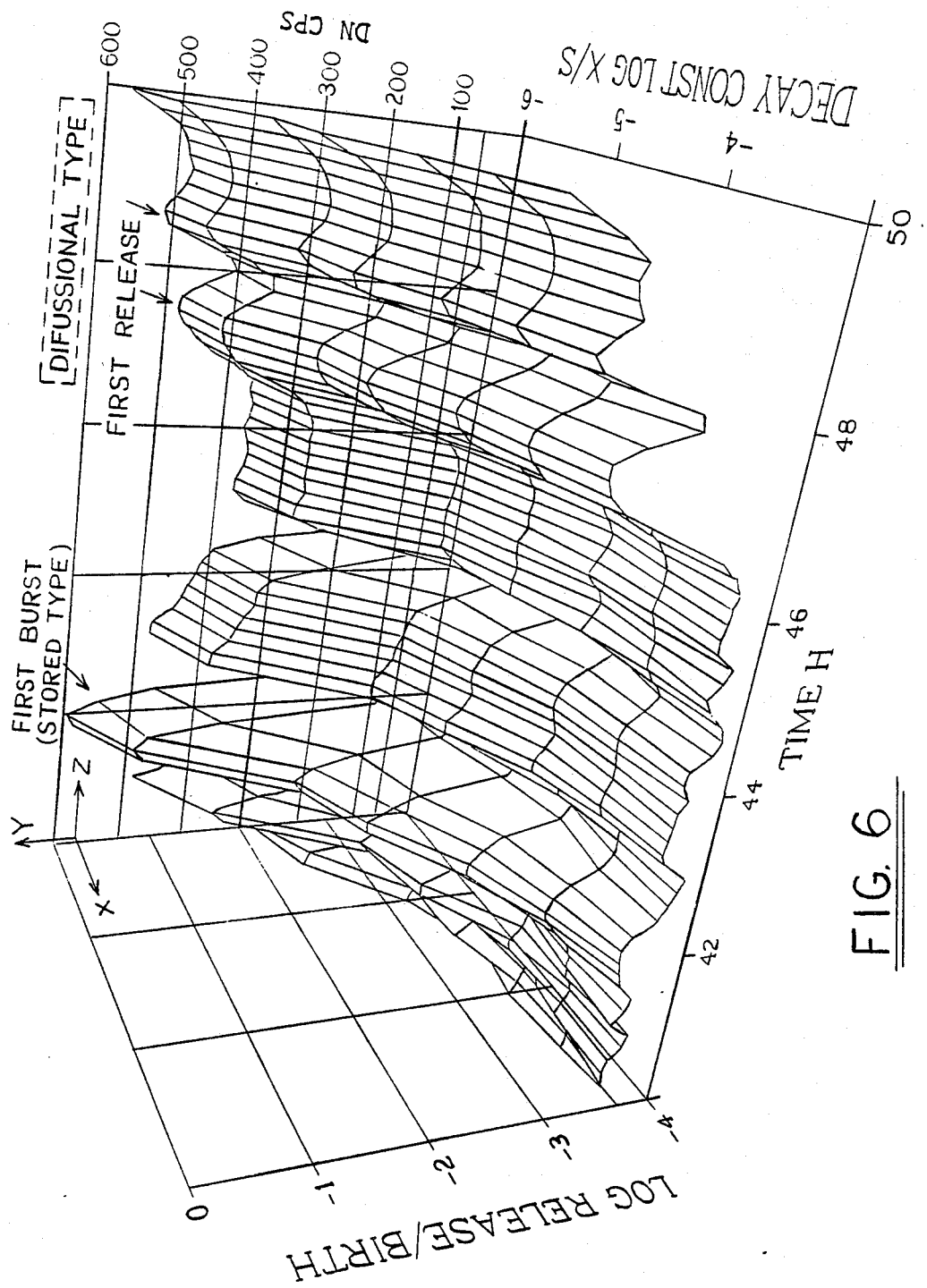
FIG. 6 is a representative 3-D curve for recoil type gas release.

To more easily visualize the changing nature of fission gas release from breached pins with time the output of microprocessor 50 may be plotted as a three dimensional contour curve of log R/B vs. log $X_i$ vs. time. Representative 3-D plots of stored gas release, diffusional gas release and recoil type gas release are shown in FIG. 4, FIG. 5 and FIG. 6, respectively. These figures were obtained from the Run-Beyond-Cladding-Breach experiments in EBR-II. In these figures, which represent a contour map of the gas release behavior, a completely flat contour in the x-y plane would correspond solely to recoil release of fission gas; a wedge-shaped mountain with a primary slope of 45° toward the back of the plot would represent a purely stored gas release; and a slope of 30° would represent purely diffusional release of fission gas from fuel element 14.

In another preferred embodiment of the present invention, the breached fuel element diagnostic system may further comprise delayed-neutron detection means 34, preferably a triple station delayed neutron analyzer. The output from delayed-neutron detection means 34 is monitored by microprocessor 50. The output of microprocessor 50, responsive to the delayed neutron detection means 34, is also graphed by plotting means 52. The delayed neutron signal in combination with the other outputs from the diagnostic system of the present invention provides useful information for analyzing the condition of breached fuel elements. The time elapsed between fission gas release and delayed neutron release is influenced by the breach type. The time between the first gas release and the first delayed neutron signal for a pin hole type breach is substantially greater than the time between a fission gas release and the delayed-neutron release for a more serious type of failure. For a pin-hole type failure the gas in the failed pin must be totally depressurized through the pin-hole before sodium enter the pin and the exposed-fuel contact gives rise to a delayed-neutron signal. In a more serious type of breach the fuel surface is exposed easily to the flowing sodium. Typical time periods observed in the Run-Beyond-Cladding-Breach experiments in EBR-II were approximately 900 hours for a pin-hole type failure while only 20 hours for more serious type breaches. Further, for upper-weld failures, release of stored gas continues during at least one operation cycle without any delayed-neutron signal increase. Therefore, a reactor operator can differentiate between fuel-column failures and upper-weld failures by means of the present invention.

When fuel is exposed to primary sodium and delayed-neutron precursors are emitted from a breached pin, gas release is of the recoil type. However, when sodium enters the breached pin and contacts the unreacted fuel surface, gaseous fission products recoil more readily into the sodium than solid delayed-neutron precursors. Therefore, for a recoil gas surface, fission gas release immediately preceeds the initial and subsequent jump in delayed-neutron signal. The operator of the reactor can therefore anticipate the delayed neutron signal increase upon the first indication of recoil fission gas release and prepare to shut down the reactor, if required, upon subsequent indication of a jump in the delayed-neutron signal.

The slope of the R/B vs. $X_i$ curve when combined with the delayed neutron signal may also be valuable in determining the stability of the breach itself.

Figure 7:
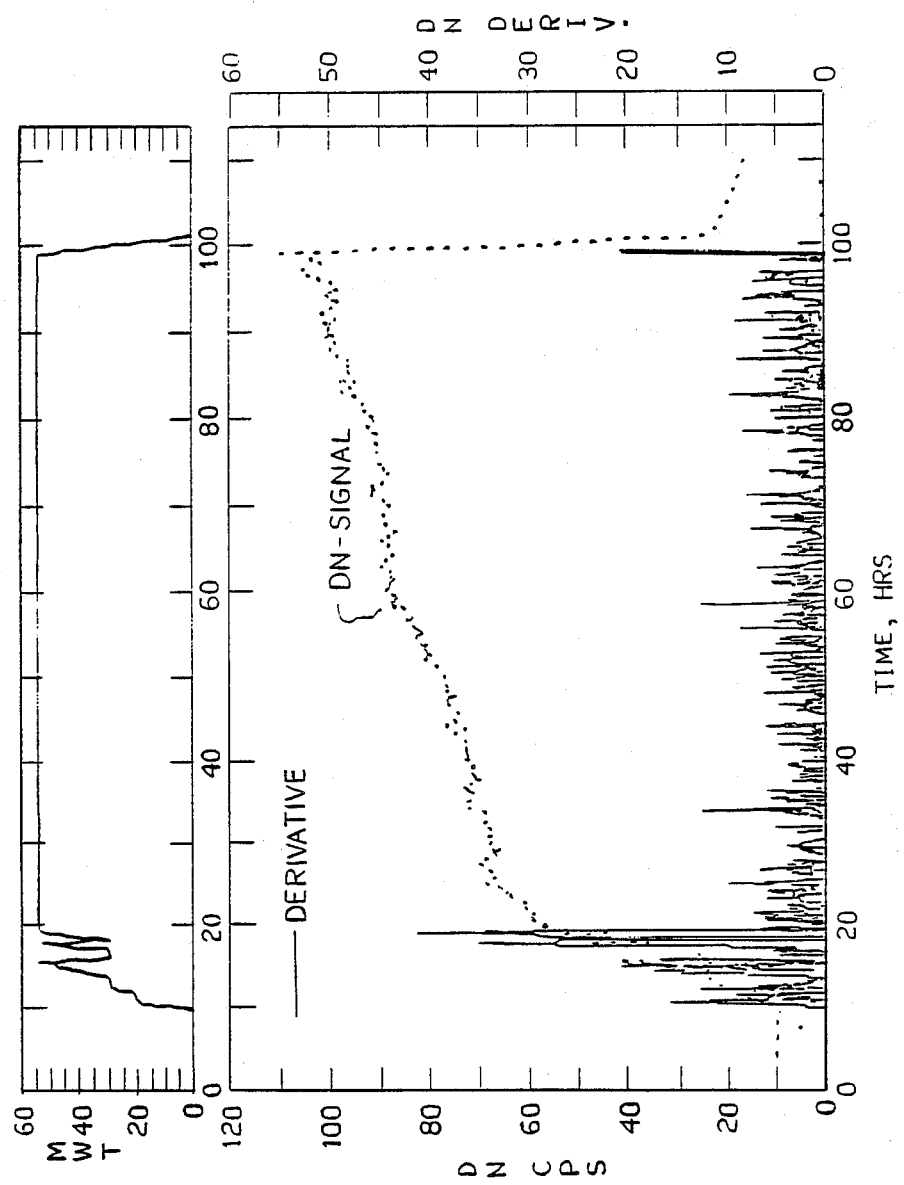
FIG. 7 is a typical graph of a predominently recoil type gas release and an associated delayed neutron release.
Figure 8:
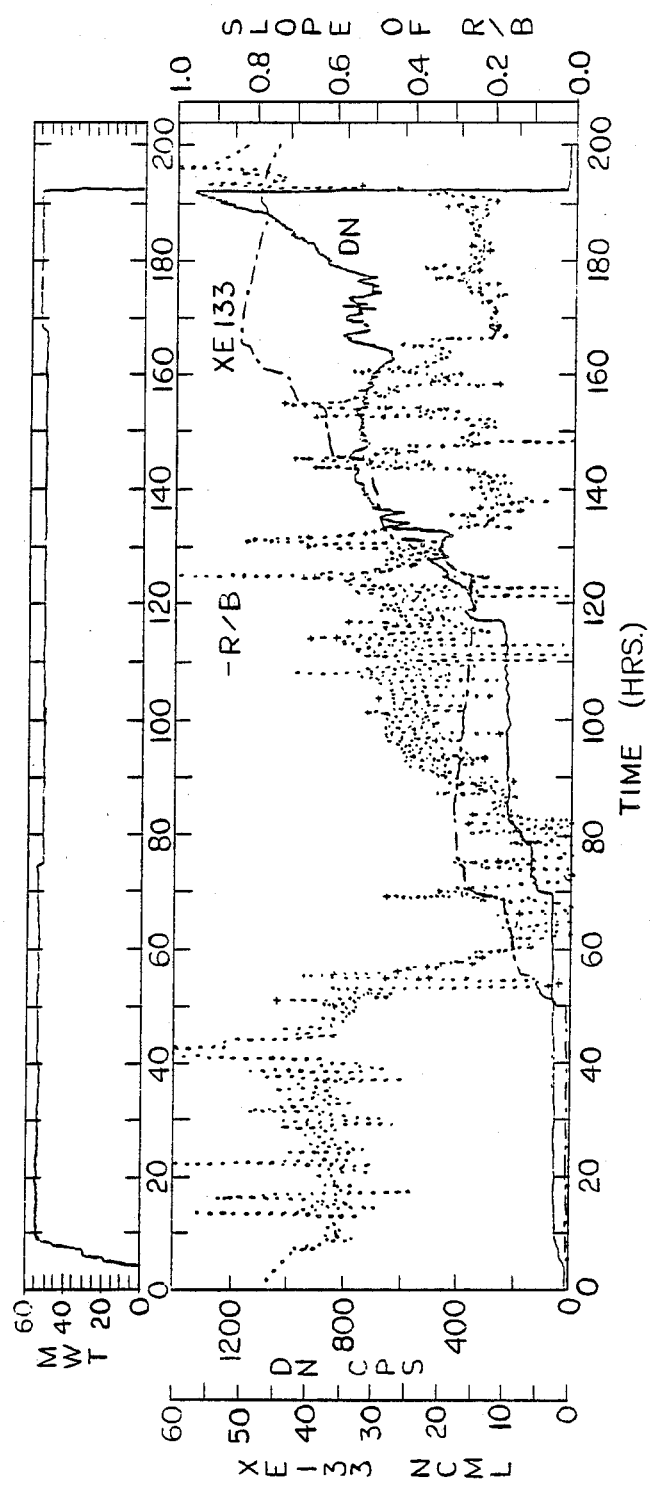
FIG. 8 is a typical graph showing irregular and sudden changes of surface, associated with an unstable breach condition.

When the slope of the R/B curve shows a predominantly recoil type gas release and is nonfluctuating during a delayed-neutron release, as illustrated in FIG. 7, the breach site maintains a stable and benign condition. However, irregular and sudden changes of surface, as illustrated in FIG. 8, suggest an unstable breach condition, such as multiple brittle cracks. As illustrated in the previous figures, the delayed-neutron signal may be superimposed on the other output graphs in order for the reactor operator to easily visualize and analyze the combination of output data.

As will be recognized by those skilled in the art, the microprocessor or other computer means may be preprogrammed to interpret the outputs of the various systems and to generate an output signal indicating to shut down or continue the operation of the reactor.

Thus, the present invention provides an apparatus and method for analyzing the condition of breached fuel elements in a nuclear reactor. The outputs of a fission gas detection means 26 and a cover gas cleanup gas system purge-rate measuring means 28 are monitored by a microprocessor 50. Microprocessor 50 corrects for the effects of the cover-gas cleanup system on the fission-gas activities measured by detection means 26 by a solution to a set of differential equations. The microprocessor 50 further calculates the derivative of the corrected fission gas activity, for each measured isotope, as a function of time.

Plotting means 52 graphs the derivative curves of the corrected fission-gas activities, which represent the instantaneous release rate of fission gas from a breached fuel element. The present invention may further utilize a breached fuel element identification means 30 the output of which is monitored by microprocessor 50. The output of identification means 30 together with fuel and fission data available to the microprocessor are used to calculate the cumulative gas released to the cover gas 22. The type of fission gas release may be determined by plotting of the R/B vs. $X_i$ curve and determining the slope of such curve. Delayed neutron signal detection means 34 may further be used to determine the stability of a breached pin.

It will be recognized by those skilled in the art, that although the present invention has been described with reference to a liquid metal reactor, the invention may be applied to light water reactors with appropriate modifications.

The foregoing description of the preferred embodiments of the invention have been presented for purposes of illustration and description. They are not intended to be exhaustive or to limit the invention to the precise form disclosed, and obviously many modifications and variations are possible in light of the above teachings.

The embodiments were chosen and described in order to better explain the principles of the invention and its practical applications to thereby enable others skilled in the art to best utilize the invention in various embodiments and with other modifications as are suited to the particular use contemplated. It is intended that the scope of the invention be defined by the claims appended hereto.

The embodiments of this invention in which an exclusive property or privilege is claimed are defined as follows:

1. In a nuclear reactor having a core of a plurality of fuel elements, said elements having a cladding, and said reactor having a cover gas and a cover-gas clean up system for removing fission gas activity from said cover-gas said cover-gas clean up system comprising an argon gas purging system, an on-line breached fuel element diagnostic system comprising:
   (a) detector means responsive to fission gas isotope activity in said cover-gas;
   (b) means for measuring the argon purge rate of said argon gas purging system;
   (c) processing means responsive to the outputs of said detector and said argon purge rate measuring means and operable to calculate the corrected gas activity, $C^*_{j+1}$, and the derivative thereof from the solution of the equations:

$$P_j = dc/dt + C_j(X_i + X_L + X_p)$$

$$dC^*/dt = P_j - C^*_j(X_i + X_L)$$

$$C^*_{j+1} = [P_j - C^*_j(X_i + X_L)]dt + C^*_j$$

where
   $dt$ = Time interval between $t_j$ and $T_{j+1}$;
   $dc$ = Activity difference of fission gas isotope i at the interval $dt = C_j + 1$;
   $C_j$ = Activity at $t_g$;
   $X_i$ = decay constant of fission gas isotope i;
   $X_L$ = Cover-gas-leak-rate constant;
   $X_p$ = Cover-gas-purge-rate constant;
   $dC^*$ = Activity different at dt without cover gas clean up system operation = $C^*_{j+1} - C^*_j$;
   $C_j^*$ = Activity at $t_j$; and;
   (d) display means responsive to the output of said data acquisition and processing means for displaying the curves of said corrected gas activity and said derivative of said corrected gas activity as a function of time, said derivative curve representing a curve of the instantaneous release rate of fission-gas from a breached fuel element.

2. The diagnostic system of claim 1 wherein said detector means is a germanium-lithium argon scanning system.

3. The diagnostic system of claim 2 wherein processing means comprises computer means.

4. The diagnostic system of claim 3 wherein said computer means is operable to calculate the theoretical gas activity stored in specific fuel elements and to determine the net source rate of an isotope in said cover gas in a time interval such that the quantity of released gas from breached fuel elements in said time interval is calculated by multiplying said net source rate times the length of said time interval times the volume of said cover gas, further comprising:
   fuel element failure location means for identifying specific breached fuel element assemblies;
   whereby the number of breached fuel elements is determined by summing the quantity of released gas over a plurality of time interval and dividing by the theoretically calculated gas activity of said identified breached fuel element assemblies.

5. The diagnostic system of claim 4 wherein said fuel element failure location means is a gas tagging system.

6. The diagnostic system of claim 5 wherein said means for determining the net source rate is operable to determine the net source rate of Xe-133.

7. The diagnostic system of claim 6 further comprising:
   reactor power detection means, said computer means being responsive to said reactor power detection means and operable to calculate the slope of the Release-to-Birth-Ratio (R/B) of an isotope of said fission gas; and
   display means responsive to the output of said microprocessor for displaying the curve of log R/B as a function of log $X_i$,
   whereby the type of fission gas released from a breached fuel element is indicated from a predetermined value of the slope of said curve.

8. The diagnostic system of claim 7 wherein said computer means is operable to calculate R/B from the equations:

$$R_i = 37V\left(\frac{1}{X_i}\frac{dC_i}{dt} + \left(\frac{x_i + X_L}{X_i}\right)C^*_i\right)\frac{(X_i + X_d)}{X_d}$$

for Kr-85 m, Kr-87, Kr-88, Xe-135 m, and Xe-138

$$R_i = 37V\left[\left(\frac{1}{X_i}\frac{dC^*_i}{dt} + \left(\frac{X_i + X_L}{X_i}\right)C^*_i - \frac{(fX_{i-1})}{X_i}C^*_2\right)\left(\frac{X_i + X_d}{X_d}\right)\right]$$

for Xe-133 an Xe-135 where
   V = Cover gas volume;
   f = Branching factor; and $$B_i = Y_{ij} F_j W_j$$

where:
   $Y_{ij}$ = Cummulative fission yield of isotope i;
   $F_j$ = Specific fission rate for fissile isotope j; and
   $W_j$ = Weight for fissile isotope j.

9. The diagnostic system of claim 8 further comprising:
- delayed-neutron detection means for measuring the delayed neutron signal from said cover gas; and display means responsive to said delayed-neutron detection means for displaying the curve of the delayed-neutron signal from said cover gas as a function of time,
- whereby the breach nechanism of a breached fuel element is indicated from a predetermined combination of said log R/B vs. log $X_i$ curves and said delayed neutron signal vs. time cuve.

10. The diagnostic system of claim 9 wherein said means for displaying the curve of log R/B vs. log $X_i$ is further operable to plot said R/B vs. log $X_i$ curve as a function of time, thereby generating a three-dimensional contour curve of log R/B vs. log $X_i$ vs. time.

11. The diagnostic system of claim 11 wherein said means for displaying is operable to superimpose said delayed-neutron signal vs. time curve on the log R/B vs. time axis of said three-dimensional plot.

12. The diagnostic system of claim 11 wherein said delayed-neutron detection means is a triple station delayed neutron analyzer.

13. In a nuclear reactor having a core of a plurality of fuel elements, said elements having a cladding, and said reactor having a cover gas and a cover-gas clean up system for removing fission gas activity from said cover-gas said cover-gas clean up system comprising an argon purging system, of diagnosing breached fuel elements comprising the steps of:
(a) measuring the fission-gas activity in said cover gas;
(b) measuring the argon purge rate of said argon gas purging system;
(c) correcting the effects of the cover-gas-clean up system on the measured fission gas activity and calculating the corrected gas activity $C^*_{j+1}$;
(d) calculating the derivative of said corrected gas activity as a function of time; and
(e) plotting said corrected gas activity and derivative of said corrected gas activity as functions of time, said derivative curve representing a curve of the instantaneous release rate of fission gas from a breached fuel element, wherein the corrected gas activity, $C^*_{j}+1$ and the derivative thereof are calculated from the solution of the equations:

$$P_j = dc/dt + C_j(X_i + X_L + X_p)$$

$$dC^*/dt = P_j - C^*_j(X_i + X_L)$$

$$C^*_{j+1} = [P_j - C^*_j(X_i + X_L)]dt + C^*_j$$

where
- dt = Time interval between $t_j$ and $T_{j+1}$;
- dc = Activity difference of fission gas isotope i at the interval $dt = C_{j+1}$;
- $C_j$ = Activity at $t_j$;
- $X_i$ = decay constant of fission gas isotope i;
- $X_L$ = Cover-gas-leak-rate constant;
- $X_p$ = Cover-gas-purge-rate constant;
- $dC^*$ = Activity difference at dt without cover gas clean up system operation = $C^*_{j+1} - C^*_j$.

14. The method of claim 13 further comprising the steps of:
- identifying specific fuel element assemblies having breached fuel elements;
- calculating the theoretical gas activity stored in said identified fuel element assemblies;
- determining the net source rate of an isotope in said said cover gas in a specified time interval;
- calculating the quantity of released gas from a breached fuel element in said time interval by multiplying the net source rate times the length of said time interval times the volume of said cover gas;
- summing the quantity of released gas over a plurality of time intervals thereby determining a cummulative quantity of released gas; and dividing said cummulative quantity by said theoretically calculated gas activity, whereby the number of breached fuel elements is determined.

15. The method of claim 14 further comprising the steps of:
- measuring the nuclear reactor power;
- calculating the Release-to-Birth-Ratio (R/B) of an isotope of said fission gas;
- plotting the curve of log R/B as a function of log $X_i$;
- whereby the type of fission gas released from a breached fuel element is indicated from a predetermined value of the slope of said curve.

16. The method of claim 15 wherein R/B is calculated from the equations:

$$R_i = 37V\left(\frac{1}{X_i}\frac{dC_i}{dt} + \left(\frac{x_i + X_L}{X_i}\right)C^*_i\right)\frac{(X_i + X_d)}{X_d}$$

for Kr-85 m, Kr-87, Kr-88, Xe-135 m, and Xe-138

$$R_i = 37V\left[\left(\frac{1}{X_i}\frac{dC^*_i}{dt} + \left(\frac{X_i + X_L}{X_i}\right)C^*_i - \frac{(fX_{i-1})}{X_i}C^*_2\right)\left(\frac{X_i + X_d}{X_d}\right)\right]$$

for Xe-133 an Xe-135 where
- V = Cover gas volume;
- F = Branching factor; and $$B_i = Y_{ij} F_j W_j$$

where:
- $Y_{ij}$ = Cummulative fission yield of isotope i;
- $F_j$ = Specific fission rate for fissile isotope j; and
- $W_j$ = Weight for fissile isotope j.

17. The method of claim 16 further comprising the steps of:
- measuring the delayed-neutron signal from said cover gas;
- plotting the curve of the delayed-neutron signal from said cover gas as a function of time;
- whereby the breach mechanism of a breached fuel element is indicated from a predetermined combination of said log R/B vs. log $X_i$ curves and said delayed neutron signal vs. time curve.

18. The method of claim 17 further comprising the step of plotting the curve of log R/B vs. log $X_i$ three dimensional contour curve of log R/B vs. log $X_i$ vs. time.

* * * * *